US012330337B1

(12) United States Patent
Veal

(10) Patent No.: US 12,330,337 B1
(45) Date of Patent: Jun. 17, 2025

(54) AUTOMATED FIBER DISPENSER

(71) Applicant: Monty Veal, Chickamauga, GA (US)

(72) Inventor: Monty Veal, Chickamauga, GA (US)

( * ) Notice: Subject to any disclaimer, the term of this patent is extended or adjusted under 35 U.S.C. 154(b) by 0 days.

(21) Appl. No.: 18/775,320

(22) Filed: Jul. 17, 2024

(51) Int. Cl.
*B28C 5/40* (2006.01)
*B01F 35/71* (2022.01)
*B01F 101/28* (2022.01)

(52) U.S. Cl.
CPC .............. *B28C 5/40* (2013.01); *B01F 35/714* (2022.01); *B01F 35/71731* (2022.01); *B01F 35/7177* (2022.01); *B01F 2101/28* (2022.01)

(58) Field of Classification Search
CPC .... B28C 5/40; B01F 35/714; B01F 35/71731; B01F 35/7177; B01F 2101/28
See application file for complete search history.

(56) References Cited

U.S. PATENT DOCUMENTS 2,741,401 A * 4/1956 Kehres .................. B28C 7/0472 222/626
4,022,439 A * 5/1977 Groth ........................ B28C 5/40 366/50
4,205,919 A * 6/1980 Attwell ................. B01F 35/511 366/40
5,819,614 A 10/1998 Jander
5,931,610 A 8/1999 Rixom et al.
6,569,233 B2 5/2003 Macklin et al.
6,658,825 B1 12/2003 Bliek et al.
9,132,952 B1 9/2015 Knepp
9,266,662 B1 2/2016 Knepp
9,688,469 B2 * 6/2017 Sheesley ................ B65D 90/66
11,498,037 B2 * 11/2022 Lucas ................. B01F 35/2112
12,017,865 B2 * 6/2024 Edelman ................ B65G 47/04
2005/0237852 A1 * 10/2005 Chandran ........... B01F 35/2211 366/136
2007/0172339 A1 * 7/2007 La Forest ............ B65G 69/182 414/404

(Continued)

FOREIGN PATENT DOCUMENTS

GB 2437278 A * 10/2007 ............... B28C 5/40

OTHER PUBLICATIONS

ABC Polymer's "FiberForce AcuBATCH" Bulk Fiber Dispenser, https://fullforcesolutions.us/wp-content/uploads/2022/06/AcuBatch-Sell-Sheet-final-4.pdf, Accessed Jul. 8, 2024.

*Primary Examiner* — Donnell A Long
(74) *Attorney, Agent, or Firm* — Chambliss, Bahner & Stophel, P.C.; Stephen D. Adams

(57) ABSTRACT

A system for dispensing a metered amount of a fiber additive into a concrete mixing system. The system includes a dispensing hopper to hold the fiber additive and to selectively dispense the fiber additive. A discharge outlet is included having an adjustable area formed between a fixed surface and a movable surface. Fiber additive exiting the dispensing hopper passes between the fixed surface and the movable surface. A conveyor and dosing wheel are the fixed and movable surfaces and dispense the fiber additive through the discharge outlet. A sensor senses an amount of fiber additive within the system and a controller controls the amount of fiber additive dispensed from the system. The specific amount is controlled by altering either a speed of the conveyor or dosing wheel or the distance between the fixed surface and the movable surface. As any of the above decrease, fiber additive discharge decreases.

20 Claims, 7 Drawing Sheets

(56) References Cited

U.S. PATENT DOCUMENTS

| | | | | |
|---|---|---|---|---|
| 2008/0179342 | A1 | 7/2008 | Woods et al. | |
| 2012/0192766 | A1* | 8/2012 | Ferraiolo | B28C 5/40<br>106/638 |
| 2013/0161354 | A1* | 6/2013 | Oren | B65D 88/542<br>220/601 |
| 2024/0261747 | A1* | 8/2024 | Lucas | B01F 35/2117 |

* cited by examiner

AUTOMATED FIBER DISPENSER

FIELD

This invention relates generally to fiber reinforced concrete or asphalt manufacturing. More specifically, it relates to an apparatus for metered dispensing of micro and macro-fibers into a concrete or asphalt mixture and a method of selectively adding metered amounts of fibers to a concrete mixture.

BACKGROUND

Concrete is one of the most commonly used building materials. It is typically formed as a mixture of an aggregate, a cement, and water, and may be utilized in buildings, roads, sculptures, furniture, and a variety of other applications. Generally, concrete begins as a mixture of aggregate and cement. Water is then added to the mixture, forming a pourable slurry, which then cures into a hardened final product. Although usable on its own, concrete is often reinforced with various materials to increase the ductility, enhance durability, control cracking, increase the tensile strength or to add other desirable properties. Most frequently, steel rebar is used to reinforce concrete. In certain instances, fibers or fiber mixtures are used in the concrete mixture to increase the structural integrity of the hardened concrete. These fibers may include steel fibers, glass fibers, synthetic fibers, and natural fibers.

Fibers generally are cylindrical and fall into one of two categories-macro-fibers and micro-fibers-based on their length and diameter. Macro-fibers are typically defined as having a minimum length of 1.5 inches. These larger fibers add post-crack residual strength and, in certain instances, can be used in lieu of steel reinforcement such as rebar and/or welded mesh wire. In addition to toughening the concrete, macro-fibers can also limit the amount or spread of cracks in concrete because the fiber strands can bridge the crack. On the other hand, in certain cases, micro-fibers may be defined as being less than 1.5 inches in length, where the typical length is between ½ inch and ¾ inch. Micro-fibers also impart desirable and possibly different properties on the concrete as compared to macro-fibers, especially during the initial curing stages and the early life of the concrete. These potential desirable properties may include increasing the concrete's resistance to plastic shrinkage cracks. However, micro-fibers generally provide minimal, if any, residual toughness for most applications. Accordingly, it is often desirable to utilize a mixture of both micro-fibers and macro-fibers. Preferably, both types of fibers are added during the production of concrete and before the concrete is poured into its final location. The type and amount of each fiber depends on the desired properties and amount of concrete being produced.

FIG. 1 depicts an example of a typical concrete production plant 100. In this case, the plant 100 includes an aggregate bin array 102 for holding a supply of aggregate, an aggregate conveyor 104 for conveying aggregate from the bin array to a desired location, cement silos 106 for holding a supply of cement, cement screw conveyors 108 for conveying cement from the cement silos to a desired location, and a mixing station 110 for receiving aggregate and cement from the aggregate bin array and cement silos, respectively, and then combining them with water to form an aggregate/cement mix (i.e., a "cement mix"). After being formed in mixing station 110, the wet cement mix is then transferred from the mixing station to trucks 112, which carry the cement mix to its intended destination. Alternatively, the dry ingredients (i.e., aggregate and cement) may be transferred to the concrete truck 112 without being mixed with water at the mixing station 110. A drum 114 of the truck 112 may then be rotated while water is added to produce the concrete mixture inside of the truck. In either case, if additives, such as the micro-fibers or macro-fibers mentioned above, are desired in the concrete mixture, these additives may be added in either the mixing station 110 or directly into the drum 114.

Since each batch of concrete has specific fiber additive requirements, no suitable uniform method or device exists to deliver those fiber additives to a batch of concrete in a safe and efficient manner. Fiber is often supplied to concrete manufacturers in small bags that are typically between 1-7.5 pounds, but typical batches of concrete require 10-60 pounds of additive, with the ratio of micro-fibers to macro-fibers being around 1:4. These small bags of fiber are often loaded into the mixing station 110 or drum 114 individually by hand, which is slow and presents safety concerns for the workers carrying out the loading process. For example, as shown in FIG. 2, a worker 116 manually transfers a bag of fiber 118 while standing on a platform 120 located at the rear of truck 112, which provides access to drum 114. While the bag of fiber 118 may be raised up to the platform 120, such as by a forklift or other similar lifting means 122, it must still be lifted by the worker, opened, and then dumped into the drum 114 via chute 124. Alternatively, water soluble bags may be lifted and placed in the chute 124. Not only is this very time consuming, but it also places the individual in a dangerous position (i.e., lifting and reaching beyond the boundary of the platform 120 while suspended over the ground).

In an alternative fiber delivery method, shown in FIG. 3, fiber is provided in a large bulk bag 126 that may be raised and then suspended over chute 124 by lifting means 122 (e.g., backhoe loader). Again, a worker 116 stands on the platform 120 to correctly position the bag 126, open the bottom of the bulk bag, and then dispense the fiber into the chute 124. Performing these tasks from the platform 120 and under an arm of lifting means 122 and under bag 126 places the worker 116 in a dangerous position. Further, the worker 116 is at risk of being injured by the bulk bag 126 as it is placed over the chute 124 and is further placed at risk when reaching under the bulk bag to open the bottom.

Certain devices and methods have been created for loading bulk material seeking to address the issues described above. However, many of these devices and methods still place workers in dangerous positions and/or impart undesirable characteristics on the fiber and introduce new problems for consistent distribution of the fibers. For example, many of these devices and methods result in fibers "clumping" or becoming bunched together, which is not desired. Additionally, these devices generally cannot deliver the needed amount of fiber into the concrete mix within the required batch times. This is especially true for macro-fibers, as they require higher dosage rates/yard versus micro-fibers and are much more difficult to move. Finally, conventional fiber dispensing devices and methods do not work suitably for both micro-fibers and macro-fibers. In addition, many similar issues are present in the production of asphalt if the asphalt utilizes fiber additives.

What is needed, therefore, is a dispenser for micro-fibers and macro-fibers for providing even and accurate dispensing of the fibers within the required batch times, while maintaining worker safety.

NOTES ON CONSTRUCTION

The use of the terms “a”, “an”, “the” and similar terms in the context of describing embodiments of the invention are to be construed to cover both the singular and the plural, unless otherwise indicated herein or clearly contradicted by context. The terms “comprising”, “having”, “including” and “containing” are to be construed as open-ended terms (i.e., meaning “including, but not limited to,”) unless otherwise noted. The terms “substantially”, “generally” and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

Terms concerning attachments, coupling and the like, such as “attached”, “connected” and “interconnected”, refer to a relationship wherein structures are secured or attached to one another either directly or indirectly through intervening structures, as well as both moveable and rigid attachments or relationships, unless otherwise specified herein or clearly indicated as having a different relationship by context. The term “operatively connected” is such an attachment, coupling or connection that allows the pertinent structures to operate as intended by virtue of that relationship.

The use of any and all examples or exemplary language (e.g., “such as” and “preferably”) herein is intended merely to better illuminate the invention and the preferred embodiments thereof, and not to place a limitation on the scope of the invention. Nothing in the specification should be construed as indicating any element as essential to the practice of the invention unless so stated with specificity.

SUMMARY

The following presents a simplified summary of one or more embodiments of the invention to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing a system for dispensing of a fiber additive into a mixing system. In certain embodiments, the mixing system is a concrete mixing system for producing a reinforced concrete mixture. The system may comprise a dispensing hopper, a discharge outlet, a conveyor, a sensor, and a controller. The dispensing hopper may have a hollow interior sized and configured to receive said fiber additive. The dispensing hopper is further configured to selectively dispense the fiber additive. The discharge outlet may have an adjustable area through which fiber additive can pass. The adjustable area is formed between a first surface and a second surface and enables fiber additive to pass out of the dispensing hopper and into the mixing system. The first surface and the second surface may be movable with respect to the other. The fiber additive passing out of the dispensing hopper via the discharge outlet passes between the first surface and the second surface. The conveyor may have a receiving end and a discharge end. The conveyor may be disposed in a bottom of the dispensing hopper such that at least a portion of the fiber additive stored within the dispensing hopper is configured to be placed on top of the conveyor at the receiving end. Further, the conveyor is configured to move fiber additive within the conveyor towards and through the discharge outlet. The conveyor may further dispense the fiber additive from the discharge end. The sensor may be configured to sense at least one of an amount of fiber additive that is disposed within the system. Finally, the controller may control the amount of fiber additive dispensed from the dispensing hopper via the discharge outlet by selectively modifying at least one of a speed of the conveyor and a size of the discharge outlet. The size of the discharge outlet may be modified by moving the second surface with respect to the first surface. In certain embodiments, the first surface may be a fixed surface and the second surface may be a movable surface.

In certain embodiments, the system may further comprise a loading hopper for removably connecting to the dispensing hopper and for resupplying the dispensing hopper with fiber additive. The loading hopper may have a first end that is configured to receive fiber additive for temporary storage in the loading hopper. The loading hopper may optionally have a second end that is removably engaged with an inlet of the dispensing hopper and configured to be remotely moved between an open position and a closed position. When the second end of the loading hopper is in the closed position, the temporarily stored fiber additive is prevented from being dispensed from the loading hopper. When the second end of the loading hopper is engaged with the inlet of the dispensing hopper and in the open position, the fiber additive temporarily stored within the loading hopper is permitted to flow out of the loading hopper and into the dispensing hopper.

Regarding the first surface, in certain instances, the first surface is provided by the discharge end of the conveyor. Further, the system may additionally comprise a dosing wheel disposed proximate the discharge end of the conveyor and providing the second surface. The dosing wheel is driven by a motor to rotate at a rotational speed about a central axis. The dosing wheel is further configured to contact and to prevent fiber additive from passing out of the dispensing hopper absent a rotation of the dosing wheel. Further the dosing wheel is configured to move the second surface towards and away from the first surface to decrease and increase, respectively, the adjustable are of the discharge. The controller is further configured to control the amount of fiber additive dispensed from the dispensing hopper via the discharge outlet by selectively modifying the rotational speed of the dosing wheel.

In further embodiments, the system may optionally include an enclosed discharge chute having a first end with an opening that is configured to receive fiber additive that passes between the first surface and the second surface via the conveyor. The discharge chute also includes a second end having an opening configured to dispense the fiber additive that passes through the chute and into the mixing system.

The system may also include a fluid mister disposed at the second end of the discharge chute. The fluid mister is configured to spray fiber additive passing through the discharge chute before the fiber additive is dispensed into the mixing system. The fluid mister may further comprise a plurality of misters disposed at intervals along the second end of the discharge chute.

In yet further embodiments, the system may include a blower configured to provide a blowing force to move the fiber additive through the discharge chute, out of the opening at the second end of the discharge chute, and into the mixing system. In certain embodiments, the blowing force is adjustable and based on at least one of: a total amount of fiber additive intended to be added to the concrete mixture, a current amount of fiber additive that has been added to the concrete mixture, a current amount of fiber additive that remains to be added to the concrete mixture, a target weight of the dispensing hopper, and a target among of the concrete mixture.

In certain embodiments, the system may further comprise a source of pressurized air for delivering an amount of pressurized air to the fiber additive separately from the blowing force.

In further embodiments, the dispensing hopper may optionally comprise a first dispensing hopper sized and configured to receive a first fiber additive and a second dispensing hopper sized and configured to receive a second fiber additive, the fiber additives being combined and provided to the concrete mixing system for use in producing the reinforced concrete mixture. The first dispensing hopper and the second dispensing hopper may be disposed on a common, unitary chassis. Optionally, a combined enclosed discharge chute is included in the system. The discharge chute has a first end with an opening that is configured to receive and to combine the first and second fiber additive passing out of the first and second dispensing hoppers. The discharge chute further has an opening that is configured to discharge the combined fiber additive into the concrete mixing system. The system, according to further embodiments, includes a blower disposed at the first end of the discharge chute and is configured to provide a blowing force to the combined fiber additive.

In yet further embodiments, the first and second dispensing hoppers are provided with separate discharge outlets and separate conveyors. In those embodiments, the speed of the conveyor and the adjustable area of the discharge outlet of each of the first and second dispensing hoppers are independently adjustable via the controller. The adjustment at the controller allows for the amounts and rates of the first and second fiber additive passing out of each of the first and second dispensing hoppers to be independently adjusted. Optionally, the first dispensing hopper and the second dispensing hopper are arranged in series. Further the controller is configured to selectively operate each of the separate conveyors. In yet further embodiments, the first fiber additive comprises a micro-fiber additive and the second fiber additive comprises a macro-fiber additive.

In yet further embodiments, the first surface of the adjustable area of each of the first and second dispensing hoppers may be provided by the discharge end of each conveyor. The system may further comprise a first dosing wheel disposed proximate the discharge end of the conveyor of the first dispensing hopper and a second dosing wheel disposed proximate the discharge end of the second dispensing hopper. Each dosing wheel providing the second surface of the respective adjustable area. Each dosing wheel is driven by a motor to rotate at a rotational speed about a central axis. Each dosing wheel is further configured to contact and to prevent fiber additive from passing out of the dispensing hopper absent a rotation of the respective dosing wheel. Further, the dosing wheel is configured to move the second surface towards and away from the first surface to decrease and increase, respectively, the adjustable area of each discharge outlet. The controller may be further configured to control the amount of fiber additive dispensed from the first and second dispensing hopper via the respective discharge outlet by selectively modifying the rotational speed of each dosing wheel.

Also disclosed herein is a system for dispensing a fiber additive into a mixing system. The system may comprise a dispensing hopper, a discharge outlet, a conveyor, and a dosing wheel. The dispensing hopper may have a hollow interior sized and configured to receive said fiber additive and be configured to selectively dispense the fiber additive. The discharge outlet may be formed between a first surface and a second surface. The discharge outlet may enable fiber additive to pass out of the dispensing hopper and into the mixing system. The fiber additive passing out of the dispensing hopper via the discharge outlet may pass between the first surface and the second surface. The convey may have a receiving end and a discharge end. The conveyor may be disposed in a bottom of the dispensing hopper such that at least a portion of the fiber additive within the dispensing hopper is configured to be placed on top of the conveyor at the receiving end. The conveyor is configured to aid in moving fiber additive within the dispensing hopper towards and through the discharge outlet, thereby dispensing the fiber additive from the discharge end. The dosing wheel is disposed proximate the discharge end of the conveyor. The dosing wheel may be driven by a motor to rotate at a rotational speed about a central axis. The dosing wheel may be configured to contact and to prevent fiber additive from passing out of the dispensing hopper absent a rotation of the dosing wheel.

Also disclosed herein is a method for providing a metered amount of a fiber additive to a concrete mixing system for forming a reinforced concrete mixture. The method may include a first step of providing said concrete mixing system The next step may include providing a dispensing system for dispensing the fiber additive into the concrete mixture. the system may comprise a dispensing hopper, a discharge outlet, a conveyor, a sensor, and a controller. The dispensing hopper may have a hollow interior that is sized and configured to receive and store fiber additive. The dispensing hopper may further be configured to selectively dispense the fiber additive. The discharge outlet may have a variable adjustable area through which fiber additive can pass. The discharge outlet is further formed between a fixed surface and a movable surface and enables the fiber additive to pass out of the dispensing hopper and into the concrete mixing system The fiber additive passing out of the dispensing hopper via the discharge outlet may pass between the fixed surface and the movable surface. The conveyor of the system may have a receiving and a discharge end. The conveyor may be disposed in a bottom of the dispensing hopper such that at least a portion of the fiber additive stored in the dispensing hopper is configured to be placed on top of the conveyor at the receiving end. Further, the conveyor is configured to move fiber additive stored within the dispensing hopper towards and through the discharge outlet and to discharge the fiber additive from the discharge end. In certain embodiments, the system may further comprise a dosing wheel having a central axis, disposed proximate the discharge end of the conveyor. A motor may be further configured to rotate the dosing wheel at a rotational speed about the central axis. The sensor may sense an amount of fiber additive disposed within the dispensing system. Further, the controller may be configured to control the amount of fiber additive dispensed from dispensing hopper via the discharge outlet. To control the amount, the controller selectively modifies at least one of a speed of the conveyor and an adjustable area of the discharge outlet. The rotational speed of the dosing wheel may also be modified to control the amount. Further, the adjustable area of the discharge outlet is modified by moving the movable surface with respect to the fixed surface.

The method may include the next step of placing the fiber additive into the dispensing hopper. Then, using the sensor, sensing a first amount of fiber additive disposed within the dispensing system. Next, the conveyor is activated, and fiber additive is discharged from the dispensing hopper via the discharge outlet at a first rate of discharge. In certain embodiments, the dosing wheel may also be rotated. The next step may include using the sensor, sensing a second amount of fiber additive disposed within the dispensing system. The final step may include using the controller, modifying one of the speed of the conveyor or the adjustable area of the discharge outlet in order to provide a second and different rate of discharge for dispensing fiber additive from the dispensing hopper via the discharge outlet.

In certain embodiments, the method incudes further steps of providing the controller with a desired amount of fiber additive to be dispensed from the dispensing hopper. Then, using the sensor, detecting an amount of fiber additive dispensed from the dispensing hopper. Finally, once the desired amount of fiber additive is dispensed, using the controller, deactivating the conveyor, and ceasing rotation of the dosing wheel.

In certain further embodiments, the method may include the further steps of providing the controller a trigger percentage corresponding to a desired amount of fiber additive to be dispensed. The sensor may be used to detect the amount of fiber additive dispensed form the dispensing hopper. Upon reaching the trigger percentage, the controller may reduce a speed of the conveyor and the rotational speed of the dosing wheel as the sensor detects a discrete amount of fiber additive.

BRIEF DESCRIPTION OF THE DRAWINGS

Further advantages of the invention are apparent by reference to the detailed description when considered in conjunction with the figures, which are not to scale to more clearly show the details, wherein like reference numerals represent like elements throughout the several views, and wherein.

DETAILED DESCRIPTION

Figure 1:
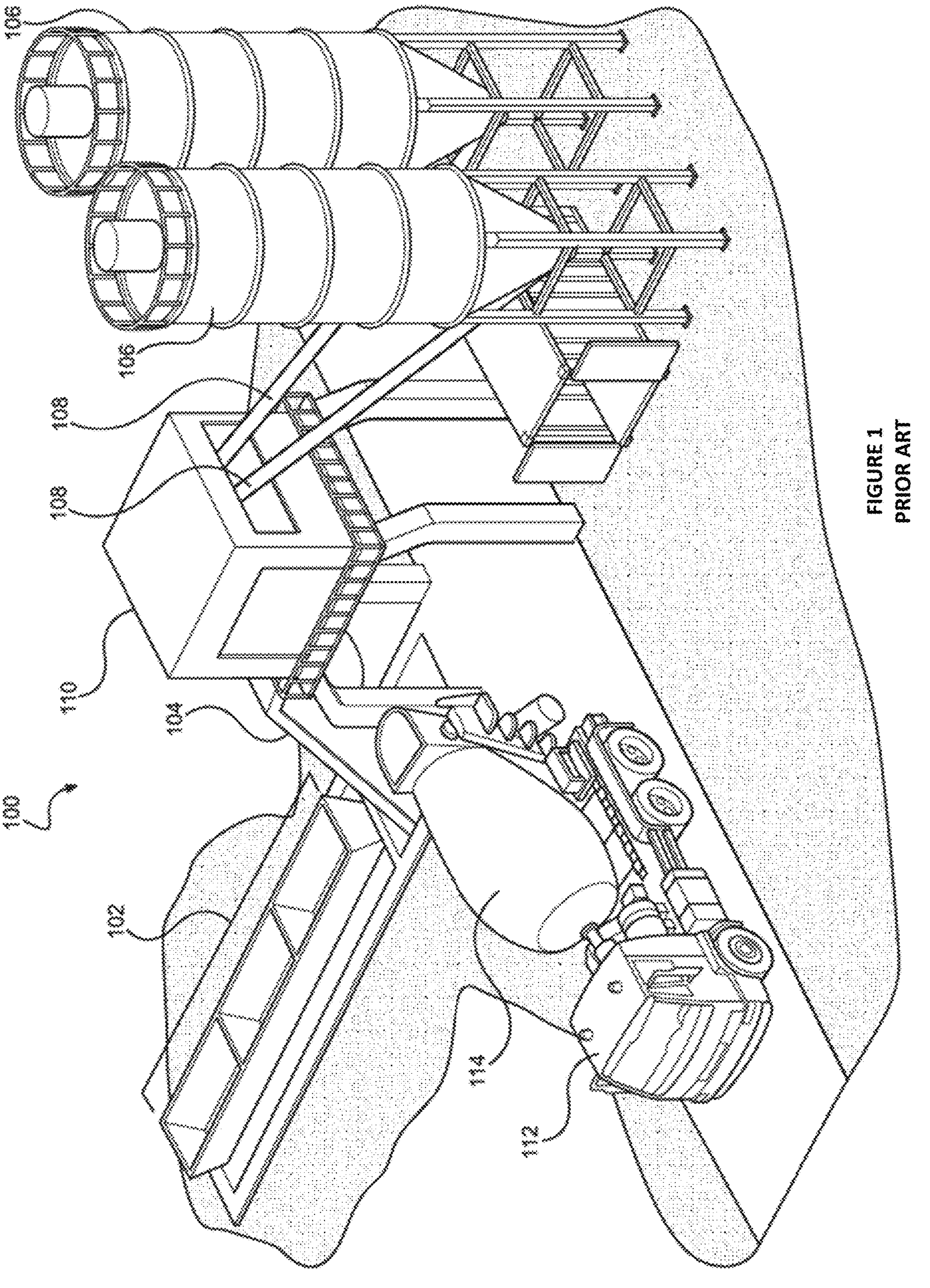
FIGURE 1 PRIOR ART
FIG. 1 is a depicts a conventional concrete mixing plant.
Figure 3:
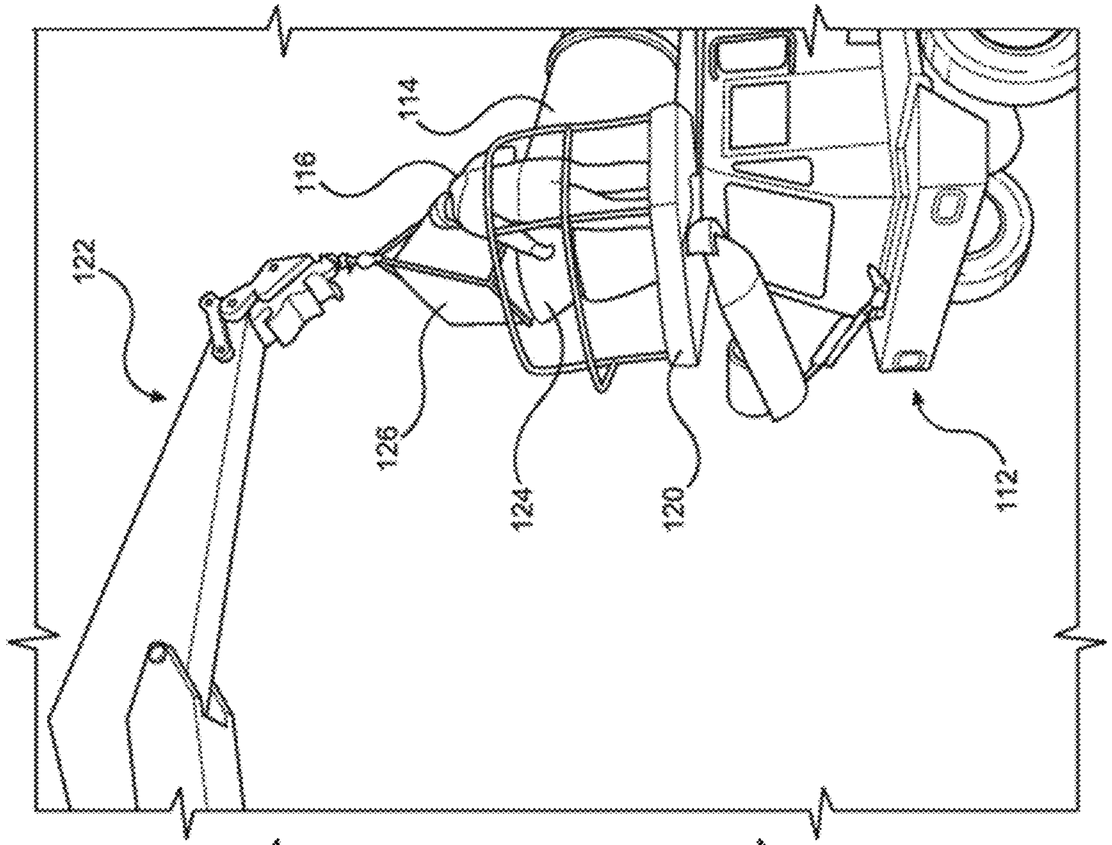
FIGURE 3 PRIOR ART
FIG. 3 depicts an alternative conventional method for adding a fiber additive to a concrete mixture.
Figure 2:
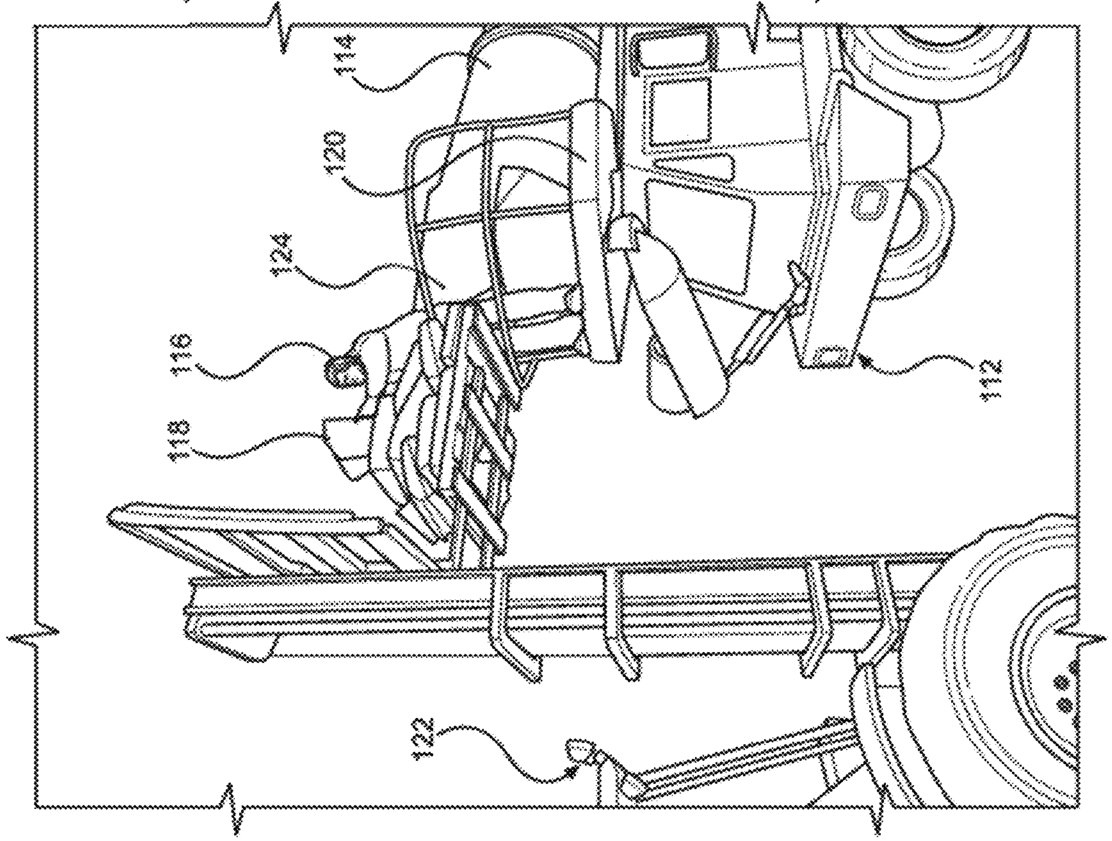
FIGURE 2 PRIOR ART
FIG. 2 depicts a first conventional method for adding a fiber additive to a concrete mixture.
Figure 4:
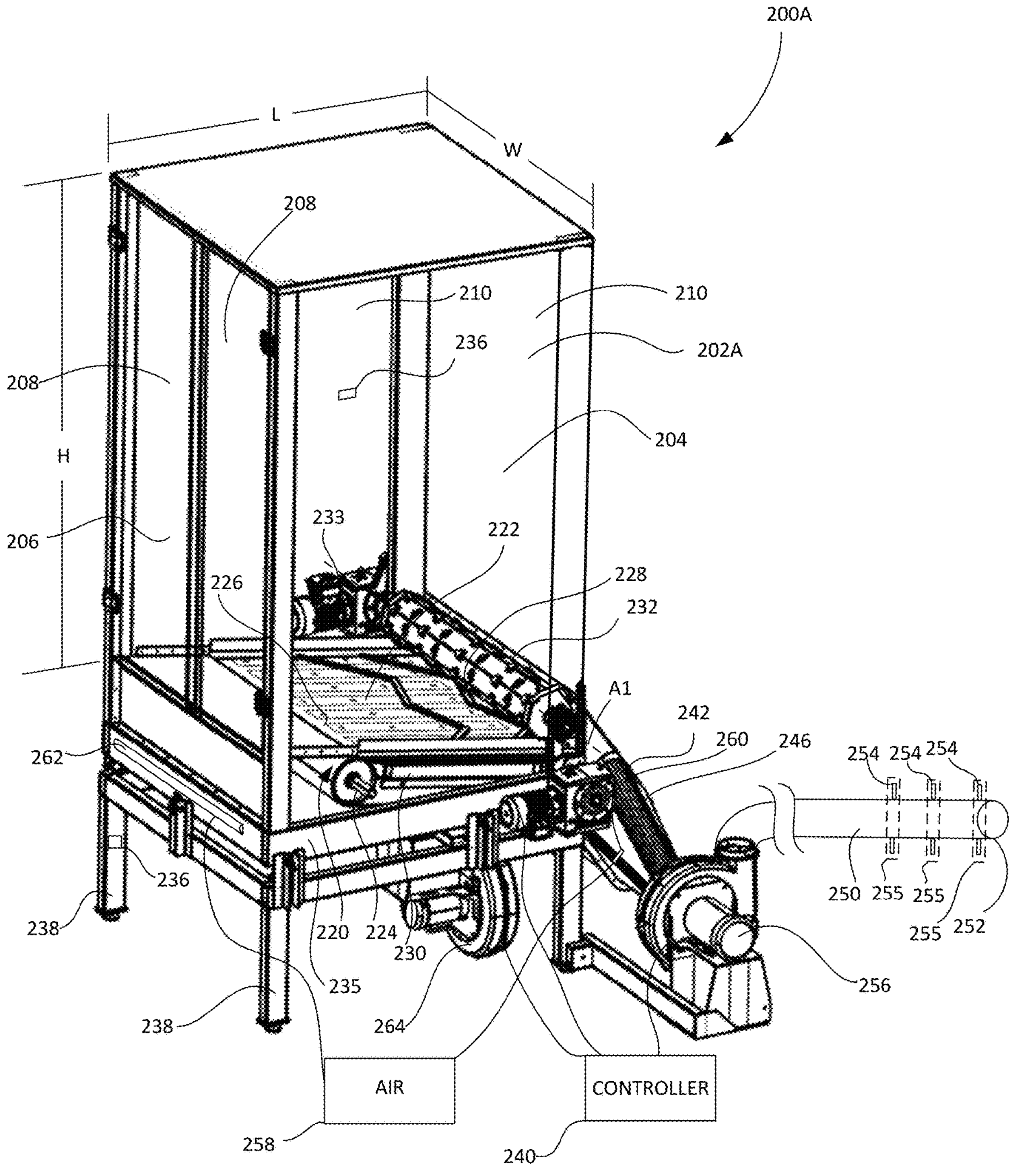
FIG. 4 is a perspective view of a system for metered dispensing of a fiber additive into a concrete mixing system for producing a reinforced concrete mixture according to an embodiment of the present invention.

Referring now to FIG. 4, there is shown a system 200A for metered dispensing of a fiber additive into a concrete mixing system, such as system 100 (shown in FIG. 1) or truck 112 (shown in FIGS. 2 and 3), for producing a reinforced concrete mixture. Alternatively, the system may be used in asphalt production. In certain embodiments, the system 200A includes a single dispensing hopper 202A. In other embodiments, and in reference to FIG. 5A and FIG. 5B with continued reference to FIG. 4, a system 200B includes a pair of dispensing hoppers 202A and 202B that are structurally and functionally identical to one another and are arranged in a mirrored arrangement. Throughout this Detailed Description, systems 200A, 200B, may be referred to, more generally, by reference number 200. Further, dispensing hoppers 202A, 202B, may be referred to, more generally, by reference number 202. Each hopper 202 is provided with hollow interior 204 that is sized and configured to receive and store a fiber additive. Preferably, dispensing hopper 202 is generally dimensioned to correspond with the dimensions of bulk bags used to transport fiber additives. For example, in the illustrated embodiment, dispensing hopper 202 is roughly rectangular in shape with dimensions of 50" (Length, L)×50" (Width, W)×60" (Height, H). However, other shapes (e.g., square, circular) and sizes are contemplated. This arrangement advantageously allows fiber to be carried along the length L of hopper 202 with the assistance of gravity. By providing a pair of dispensing hoppers 202, a single system 200 can receive and dispense two different types of fiber additive, e.g., micro and macro-fibers. Alternatively, having two dispensing hoppers 202 permits a large amount of fiber additive to be held by a single system.

Dispensing hoppers 202 are each provided with an inlet 206 configured to receive a fiber additive. In certain embodiments, inlet 206 is disposed on a rear of the hopper 202 and includes a pair of doors 208 which are opened to load in fibers and closed while the system 200 is in operation. In certain embodiments, the doors 208 are hinged along the sides, to open horizontally. In other embodiments, the doors 208 are hinged at a bottom edge and, when opened, form a chute into the hopper 202. In other embodiments, the inlet 206 is provided in one of a pair of opposing side walls 210 of the dispensing hopper 202 or may be provided at any point along the entire periphery of the hopper 202. Dispensing hoppers 202 are configured to selectively dispense fiber additives, preferably through a discharge outlet 212. In systems 200B including multiple dispensing hoppers 202A, 202B, preferably, a single discharge outlet 212 is used for both dispensing hoppers 202. As further detailed below, the discharge outlet 212 includes a size-adjustable area 214 for each dispensing hopper 202 that is provided by a first surface 216 and a second surface 218. Preferably, the first surface 216 is fixed and the second surface is 218 is movable, however both surfaces 216, 218 may be fixed or movable in certain embodiments. A user-specified or predetermined amount of fiber additive located in the hopper 202 may be dispensed through the discharge outlet 212 by passing between the first surface 216 and the second surface 218.

In certain embodiments, the system 200 includes one or more conveyors 220 for moving the fiber additive within the dispensing hopper 202 from the inlet 206 to the outlet 212. In the illustrated embodiment, conveyor 220 includes a belt 222 that circulates about rollers 224 between a receiving end 226 and a discharge end 228. The conveyor 220 also preferably includes an impact bed 230 that is disposed under an upper section of belt 222 and that is configured to support the weight of the fiber additive as it is moved through the hopper 202 by conveyor 220. In certain cases, impact bed 230 is configured to support 300-500 lbs. In other cases, impact bed 230 is configured to support loads weighing up to, or exceeding, 1500 lbs. The belt 222 may be a cleated belt, drag belt, or an apron/pan conveying chain, but other suitable types of conveyors are also contemplated. A suitable conveyor 220 and belt 222 is capable of moving fiber additive from the receiving end 226 to the discharge end 228 of the hopper 202 and then out of the hopper via the discharge outlet 212. In certain embodiments, a vibrator 231 is disposed beneath the impact bed and is configured to deliver a vibratory force to the conveyor 220, aiding in breaking up any clumps of fiber additive disposed on the conveyor.

Figure 5A:
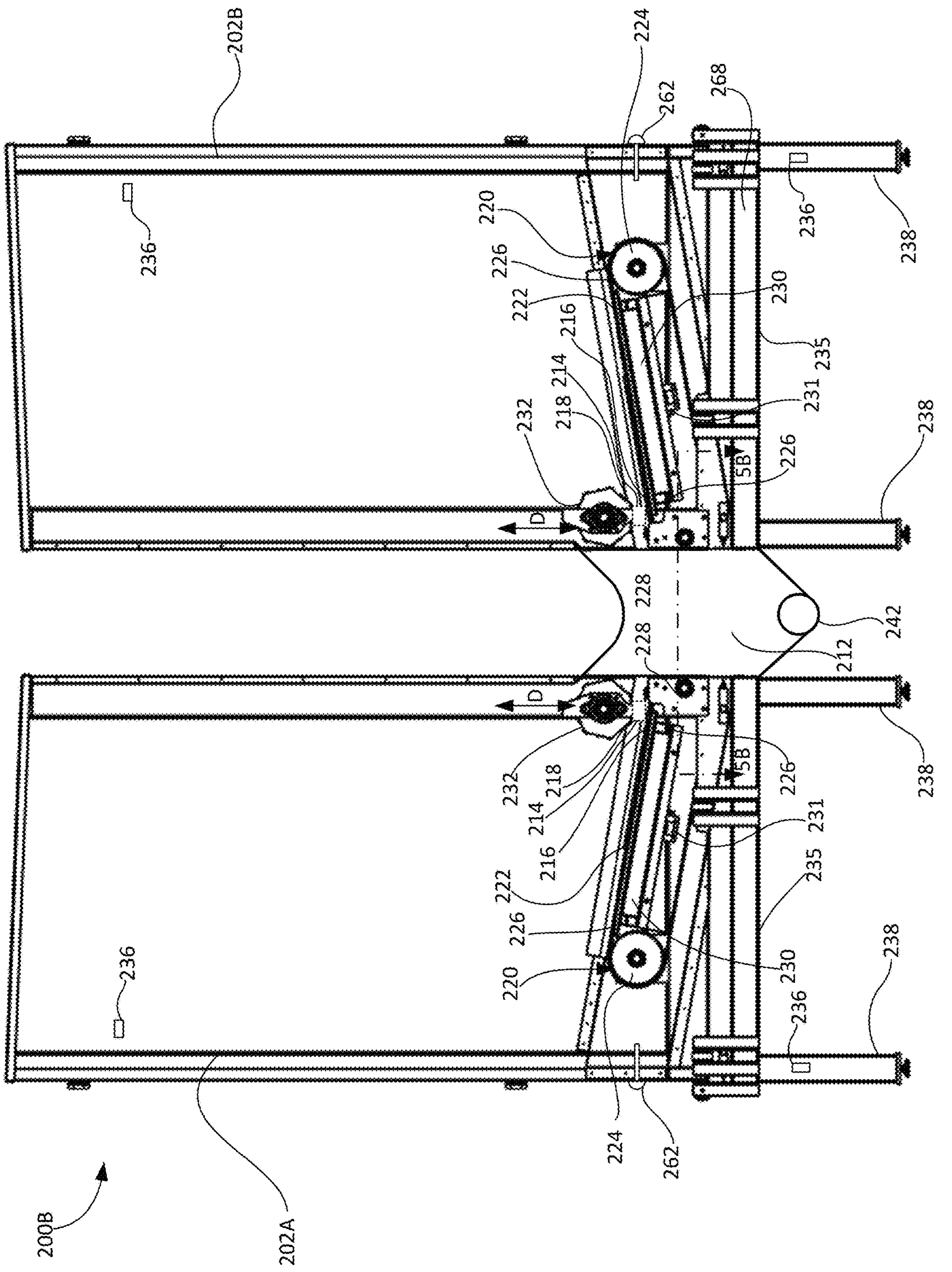
FIG. 5A is a front elevation view a system for metered dispensing of a fiber additive into a concrete mixing system for producing a reinforced concrete mixture according to an embodiment of the present invention.
Figure 5B:
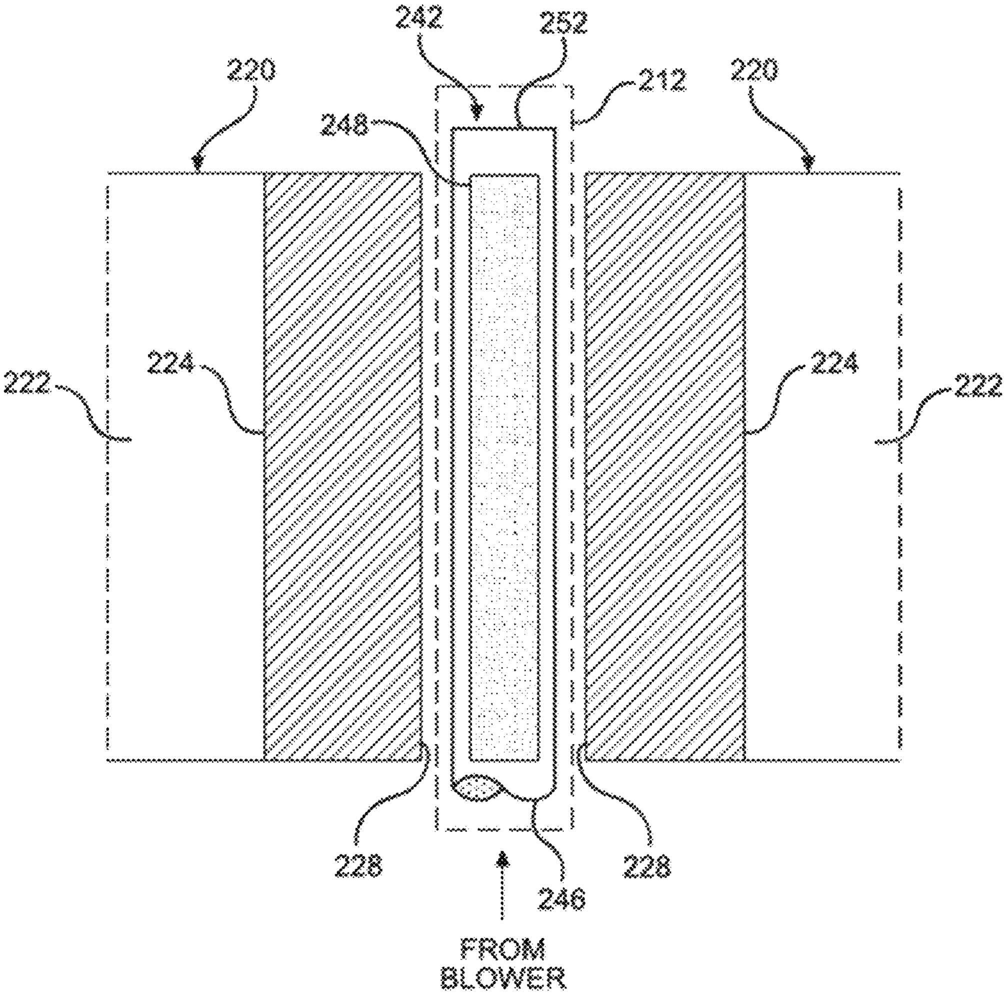
FIG. 5B is a sectional view of taken along line “5B-5B” in FIG. 5A.
Figure 5C:
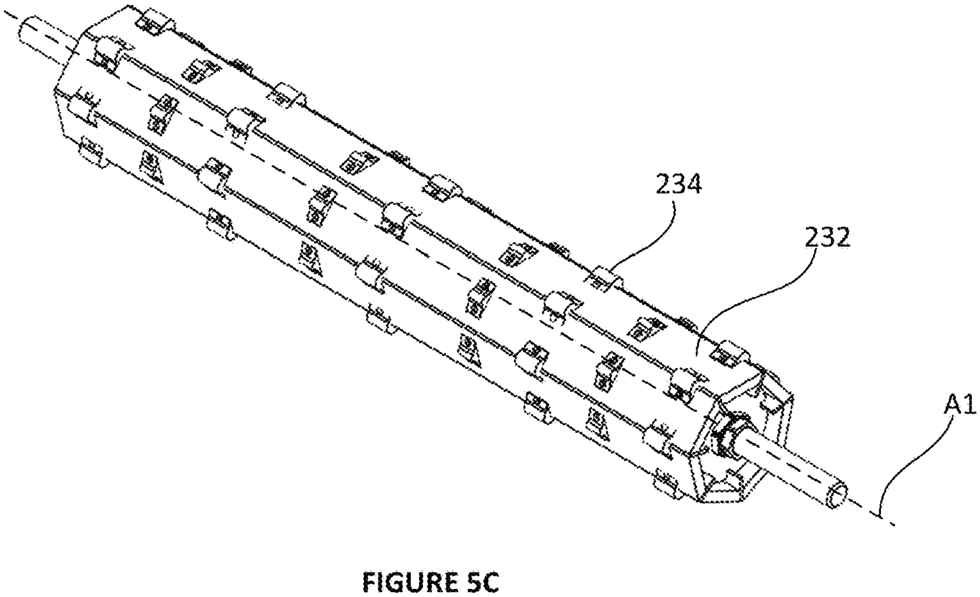
FIG. 5C depicts a dosing wheel according to an embodiment of the present invention.

Next and with additional reference to FIG. 5C, in the illustrated embodiment, the second surface 218 is movable and is provided on a dosing wheel 232. Preferably, dosing wheel 232 spans the entire width of the conveyor 220, where the "width" (W) is measured between the opposing side walls 210. Dosing wheel 232 is preferably configured to rotate about central axis A1 and be driven by motor 233 at a rotation speed. A higher rotational speed results in a higher discharge rate. While a round dosing wheel 232 is contemplated, preferably, the dosing wheel is polygonal in shape. More particularly, the dosing wheel 232 is hexagonal or heptagonal. The dosing wheel 232 may also be oblong, eccentric, or cam shaped. Disposed along the outside of the dosing wheel 232 are a series of agitation knobs 234. In operation, the agitation knobs 234 aid in breaking up any clumps in the fibers passing through the discharge outlet 212 varying the pressure applied to said fibers by the rotation of the dosing wheel 232.

In the illustrated embodiment, dosing wheel 232 is vertically movable, in direction D (FIG. 5A), towards and away from the first surface 216. The vertical motion of the dosing wheel 232 may be provided by hydraulic cylinders, mechanical linkages and appropriate motors, power screws, or other appropriate linear motion devices that are preferably automatically controlled by a controller based on the amount of fiber that is required to be dispensed and the amount of fiber that has already been dispensed. In certain embodiments, the motion control devices are manually operated by a user or by inputs from system 200. As the dosing wheel 232 moves towards or away from the first surface 216, the size-adjustable area 214 (i.e., the cross-sectional area) decreases or increases, respectively. Decreasing the size-adjustable area 214 reduces the rate at which fiber additive flows out of the discharge outlet 212 as the conveyor 220 is in motion (i.e., the discharge rate). Conversely, increasing the size-adjustable area 214 increases the discharge rate. Accordingly, by moving the dosing wheel 232, adjusting the rotational speed of the dosing wheel, and/or modifying the speed of the conveyor 220, the discharge rate can be selectively adjusted.

Preferably, belt 222 is configured to move fiber additive through the dispensing hopper 202 by moving a bottom layer of the fiber additive from the receiving end 226 to the discharge end 228 of the hopper. Upon reaching the discharge end 228, the fibers are generally prevented from passing through the adjustable area 214 by dosing wheel 232. However, the continued motion of the belt 222 keeps pressure in the fibers against the dosing wheel 232. As the dosing wheel 232 rotates, fiber moves through the discharge outlet 212 at a desired rate. By keeping pressure on the dosing wheel 232 using the conveyor 220, the fiber additive is less likely to bridge or clump. Advantageously, if clumps are present, the motion of the belt 222 under the fiber additive in combination with the rotation of the dosing wheel 232 will tend to break up those clumps. The shape of the dosing wheel 232 and the agitation knobs 234 also aid in breaking up any clumps and moving fiber additive through the discharge outlet 212. As such, conveyor 220 is preferably positioned near the bottom 235 of the dispensing hopper 202. In the illustrated embodiment, the dispensing hopper 202 is formed as an enclosed hollow box having a closed bottom 235 and the conveyor 220 is positioned just above the closed bottom at an angle sloping towards the discharge outlet 212. In other cases, the dispensing hopper 202 provides an open bottom 235 and the conveyor 220 itself is positioned in the open bottom or is otherwise integrated into the bottom of the dispensing hopper.

As previously noted, dispensing hopper 202 is configured to selectively dispense a selected amount of fiber additive through discharge outlet 212, which, in embodiments where the first surface 216 is fixed and the second surface 218 is movable, includes a size-adjustable area 214 that is defined between first second surface. Fiber additive disposed in the hopper 202 may be dispensed through the discharge outlet 212 by passing between the first surface 216 and the second surface 218. In the illustrated embodiment, the first surface 216 is fixed is provided by an upper surface of belt 222 located at the discharge end 228 of the conveyor 220. However, in other cases, another surface separate from the conveyor 220 forms the first surface 216. For example, the first surface 216 may be provided by a structure, such as a chute, plate, bar, etc., fixedly placed within the dispensing hopper 202 and preferably located between the discharge end 228 of the conveyor 220 and the discharge outlet 212 of the dispensing hopper.

The system 200 may be configured to accurately dispense a user-selected or predetermined amount or discharge rate of fiber additive. Accordingly, to measure the amount of fiber additive dispensed or the discharge rate, the system 200 may be provided with a sensor 236 to detect an amount of fiber additive disposed within the system. Preferably, the sensor 236 can detect amounts of fiber additive volumetrically, by weight, or by other suitable measuring methods. In some cases, more than one sensor 236 is provided to obtain multiple and/or different measurements. Sensors 236 may be placed in any location that is convenient or necessary for obtaining the desired measures. As specific examples, sensors 236 may be disposed on the dispensing hopper 202, the conveyor 220, a leg 238 of the hopper, or other suitable locations. Sensors 236 may include a load cell, laser level sensor, or other sensor types. In certain embodiments, the sensor may simply be a human or user who provides a specific amount of fiber to the system 200.

Typically, the discharge rate will be modified as fiber additive is dispensed. For that reason, the system 200 preferably includes a controller 240 that is configured to control the amount or discharge rate of fiber additive that is dispensed from the dispensing hopper 202 through the discharge outlet 212. To control the amount of fiber additive dispensed, the controller 240 alters a speed of the conveyor 220, the speed of the dosing wheel 232, and/or a size of the size-adjustable area 214 by moving the second surface 218 with respect to the first surface 216, if movable. The controller 240 may be a PLC or similar control device resulting in a largely automated system or may simply be a means for providing power to the various components of the system 200, such as a series of power-switches and speed controllers. When more than one dispensing hopper 202 is provided, a single controller 240 may be configured to adjust the flow rate of fiber additive from both dispensing hoppers in the same manner or independently of one another. In other embodiments, a separate controller 240 is provided for each dispensing hopper 202. For example, if a large amount of a first fiber additive and a lesser amount of a second fiber additive is desired, the controller 240 may be configured to adjust the speed of the of the conveyors 220, the speed of the dosing wheels 232, and/or the adjustable area 214 of the discharge outlets 212 of the dispensing hoppers 202 independently. Advantageously, independent adjustment of the conveyors 220, dosing wheel 232 speed, and adjustable area 214 permits the correct types and amounts of fiber additives to the be added at the correct times. For example, it may be desirable to add fiber additives at separate times. In other cases, it may be desirable to add different amounts of different fiber additives over the same time period, which would require the use of different discharge rates for each of the dispensing hoppers 202.

In certain embodiments, the system 200 includes an enclosed discharge chute 242 through which the fiber additive may be discharged. The discharge chute 242 has a first end 246 with an opening 248 configured to receive fiber additive passing between the first surface 216 and the second surface 218 through the discharge outlet 212. The discharge chute 242 also has a second end 250 having an opening 252 through which fiber additive exits the discharge chute before passing into the concrete mixing system. Preferably the discharge chute 242 is tapered from the first end 246 to the second end 250, the taper aiding the fiber additive moving into the second end without bunching. In certain embodiments, a fluid mister 254 is disposed at the second end 250 of the discharge chute 242. The fluid mister 254 sprays a fluid (e.g., water) onto the fiber additive passing through opening 252 of the discharge chute 242. Misting the fiber additive in this manner helps the fiber additive mix with the concrete mixture and prevents fiber additive from going airborne as it moves from the opening 252 into the concrete mixing system. In certain embodiments, the fluid mister 254 comprises a plurality of stages 255, each stage comprising at least one fluid mister 254. The stages 255 are spaced at various intervals along the second end 250, each stage providing additional moisture to the fiber additive passing through the discharge chute 242.

In certain embodiments, the system 200 may include a blower 256 configured to provide a blowing force to assist in moving the fiber additive through the discharge chute 242, out of opening 252, and into the concrete mixing system. The blower 256 is typically affixed to the first end 246 of the discharge chute 242 and arranged such that fiber additive does not pass through the blower. Alternatively, the blower 256 may be disposed between the first end 246 and the second end 250 and be configured to pull fiber additive through the blower before moving the fiber through the remainder of the discharge chute 242. Preferably, the blowing force may be adjusted, as needed, based on at least one of: a total amount of fiber additive intended to be added to the concrete mixture, a current amount of fiber additive that has been added to the concrete mixture, a current amount of fiber additive remaining to be added to the concrete mixture, an amount of fiber additive present in the discharge chute 242, a target weight of the dispensing hopper 202, or a target amount of the concrete mixture. For example, the blowing force will likely be larger when a large amount of fiber additive must be added to the concrete mixture. On the other hand, the blowing force might be minimal or even zero when only a small amount of fiber additive needs added to the mixture. Additionally, if a large amount of fiber additive is present in the discharge chute 242, the operating speed of the blower 256 may be increased to ensure the fiber additive moves through the discharge chute. The operation of the blower 256, including its operating speed and the resulting blowing force are preferably controlled by the controller 240.

In certain embodiments, the system 200 includes a pressurized air source 258 that preferably works cooperatively with an air nozzle 260 and delivers pressurized air to the discharge chute 242 assisting in moving any fiber additive present through the discharge chute. Preferably, the blower 256 is controlled by controller 240 to provide pressurized air pulses in addition to a preferably continuous blowing force provided by blower 256. One or more air nozzles 260 located at the first end of the discharge chute 242 and are arranged to direct air pulses into the discharge to help break up clumps of fiber additive inside of the discharge chute. Additionally, one or more additional air nozzles 262 may be located adjacent the receiving end 226 of the conveyor 220. These additional air nozzles 262 are configured to direct pressurized air, preferably in pulses, towards the discharge end 228 of the conveyor 220 to assist in moving fiber additive located on or near the conveyor 220 through the discharge outlet 212. In certain preferred embodiments, the air pulses provided by either or both air nozzles 260, 262 are delivered at predetermined intervals or based on inputs from the controller 240. Air nozzles 260, 262, can each comprise an air cannon, a pneumatic volume booster, or other similar device.

In certain embodiments, a second blower 264 is disposed beneath the conveyor 220 and is configured to deliver air pulses near the second end 228 to assist moving fiber additive through the discharge outlet 212. In certain embodiments, the second blower 264 works in tandem with air source 258 and nozzles 260, 262. However, in certain preferred embodiments, second blower 264 replaces air source 258. In those embodiments, second blower 264 is preferably configured to deliver a steady stream of pressurized air to air nozzle 262 which, in turn, helps direct fiber into the discharge outlet 212 and into the blowing force provided by blower 256.

Referring again to FIGS. 5A and 5B, in systems 200B provided with a pair of dispensing hoppers 202, as opposed to systems 200A with single dispensing hoppers, the opening 248 in the first end 246 of the discharge chute 242 is preferably configured to simultaneously receive fiber additive from each of the dispensing hoppers via a single discharge outlet 212. In certain embodiments, the first dispensing hopper 202A and the second dispensing hopper 202B share a unitary frame/chassis 268. However, in other embodiments, they are independent of one another (i.e., each mounted to a separate chassis). In certain instances, the first dispensing hopper 202A and the second dispensing hopper 202B are arranged in parallel such that fiber additive passes through each dispensing hopper simultaneously. However, in other instances, the first dispensing hopper 202A and the second dispensing hopper 202B are arranged in series such that fiber additive passes through both dispensing hoppers sequentially. Preferably, the controller 240 is configured to independently operate each of the conveyors 220, the movable surfaces 218, and the dosing wheel 232 rotational speed, to accurately control the discharge of the fiber additive and to also prevent overfilling of the discharge chute 242. Additionally, in preferred embodiments, the blower 256 and the air nozzle 260 are selectively operable, preferably by controller 240, to prevent clogs within the discharge chute 242.

Figure 7:
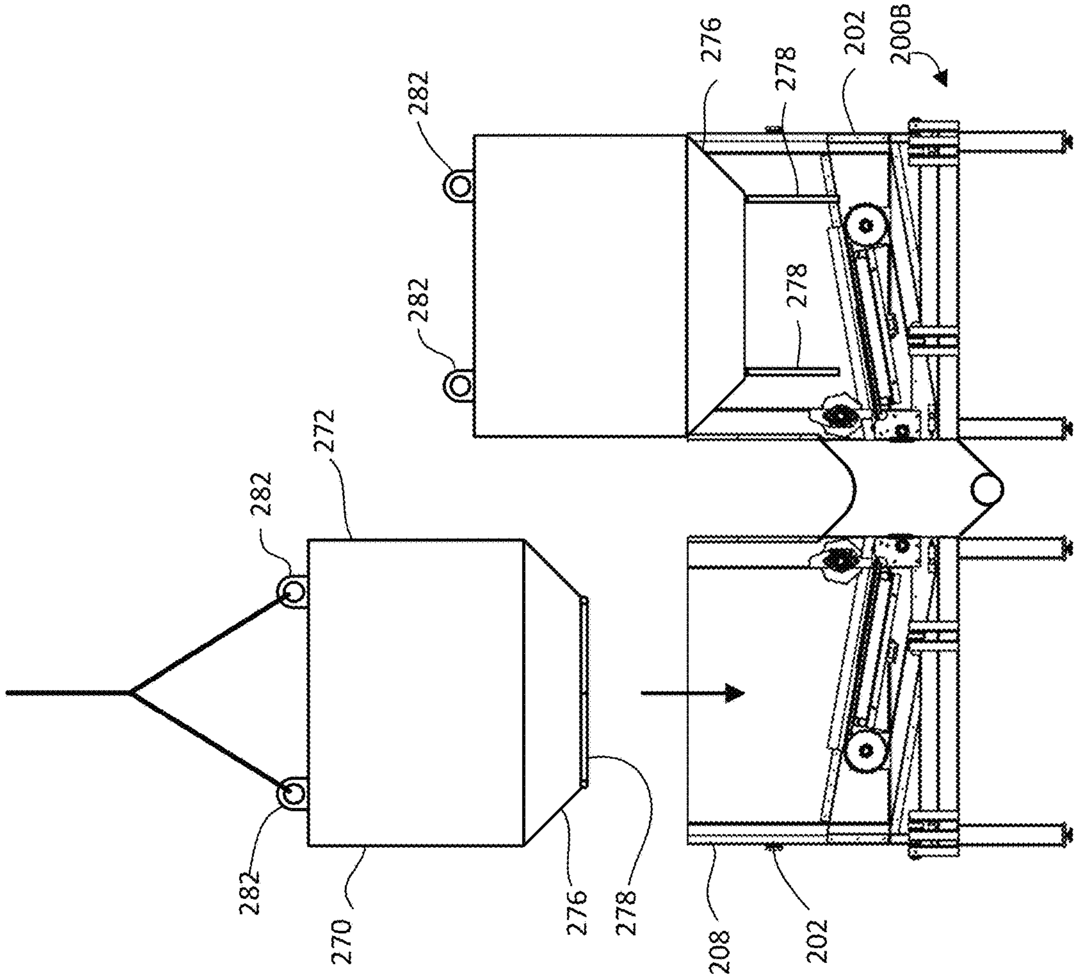
FIG. 7 depicts a pair of the loading hoppers shown in FIG. 6 used in connection with system of FIG. 5B.
Figure 6:
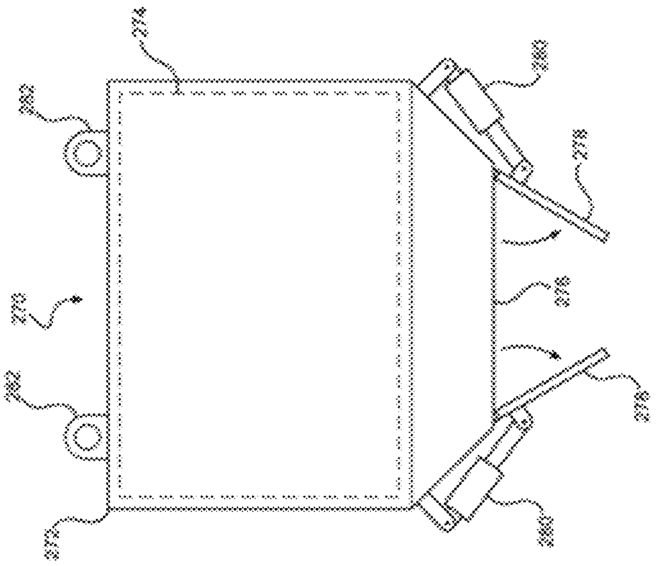
FIG. 6 is a front elevation view of loading hopper according to an embodiment of the present invention.

While fiber additive is introduced into the dispensing hopper 202 through doors 208, with reference to FIGS. 6 and 7, in certain embodiments, the system 200 also includes a re-supply or loading hopper 270 that is configured to removably connect to one or more of the dispensing hoppers 202. The loading hopper 270 includes a first end 272 that is configured to receive fiber additive. For example, the first end 272 may include an open top or an access door, like dispensing hopper 202. Fiber additive received by the loading hopper 270 may be temporarily stored within an internal storage space 274 and then dispensed to re-supply the dispensing hopper 202. Stored fiber additive may be dispensed via a second end 276 of the loading hopper 270 to one or more dispensing hoppers 202.

In certain embodiments, the second end 276 of the loading hopper 270 is configured to removably engage with the inlet 206, such as an inlet disposed in a top of the dispensing hopper 202. For example, the second end 276 in the illustrated embodiment includes tapers to position and hold the loading hopper 270 with respect to the dispensing hopper 202. In certain embodiments, the loading hopper 270 interlocks with the dispensing hopper 202 via mechanical fasteners or other suitable holding devices. An opening (not shown but disposed at the second end 276) is further configured to be remotely moved between an open position and a closed position. For example, doors 278 disposed at the second end 276 of the loading hopper 270 are configured to be selectively held open when the loading hopper is engaged with the dispensing hopper 202 to permit fiber additive to move out of the loading hopper and into the dispensing hopper. Then, the doors 278 are closed, preferably before the second end 276 of the loading hopper 270 is removed from the dispensing hopper 202. Even more preferably, doors 278 are remotely and/or automatically closed by controller 240 and/or by a user while the second end 276 of the loading hopper 270 is attached to dispensing hopper 202 and after the fiber additive has been moved into the dispensing hopper 202. In certain embodiments, the doors 278 are moved between the open and closed position by externally mounted hydraulic cylinders 280 in response to commands from the controller 240. Also contemplated are externally operated levers, gears, motors, or other suitable motion control devices. In other embodiments, the doors 278 may be a single door.

In preferred embodiments, the loading hopper 270 is provided with a lifting-assist member to facilitate raising and lowering the loading hopper safely. For example, in the illustrated embodiment, the lifting-assist member comprises lifting lugs 282 disposed at the first end 272 (i.e., the top, in the illustrated embodiment) of the loading hopper 270. However, other lifting assist members are also contemplated. Lugs 282 provide a mounting location for straps, chains, etc. to be attached to the loading hopper 270 as it is raised and lowered into place on the dispensing hopper 202. As the loading hopper 270 engages with the inlet 206 of dispensing hopper 202, the second end 276 is moved into an open position, permitting the fiber additive to flow out of the loading hopper and into the dispensing hopper. If doors 278 are provided, they are preferably automatically opened via a mechanical linkage or a proximity sensor operating an opening mechanism, such as cylinders 280. In other instances, the doors 278 are opened via an external input, such as by moving a lever or inputting an opening control into the controller 240.

Figure 8:
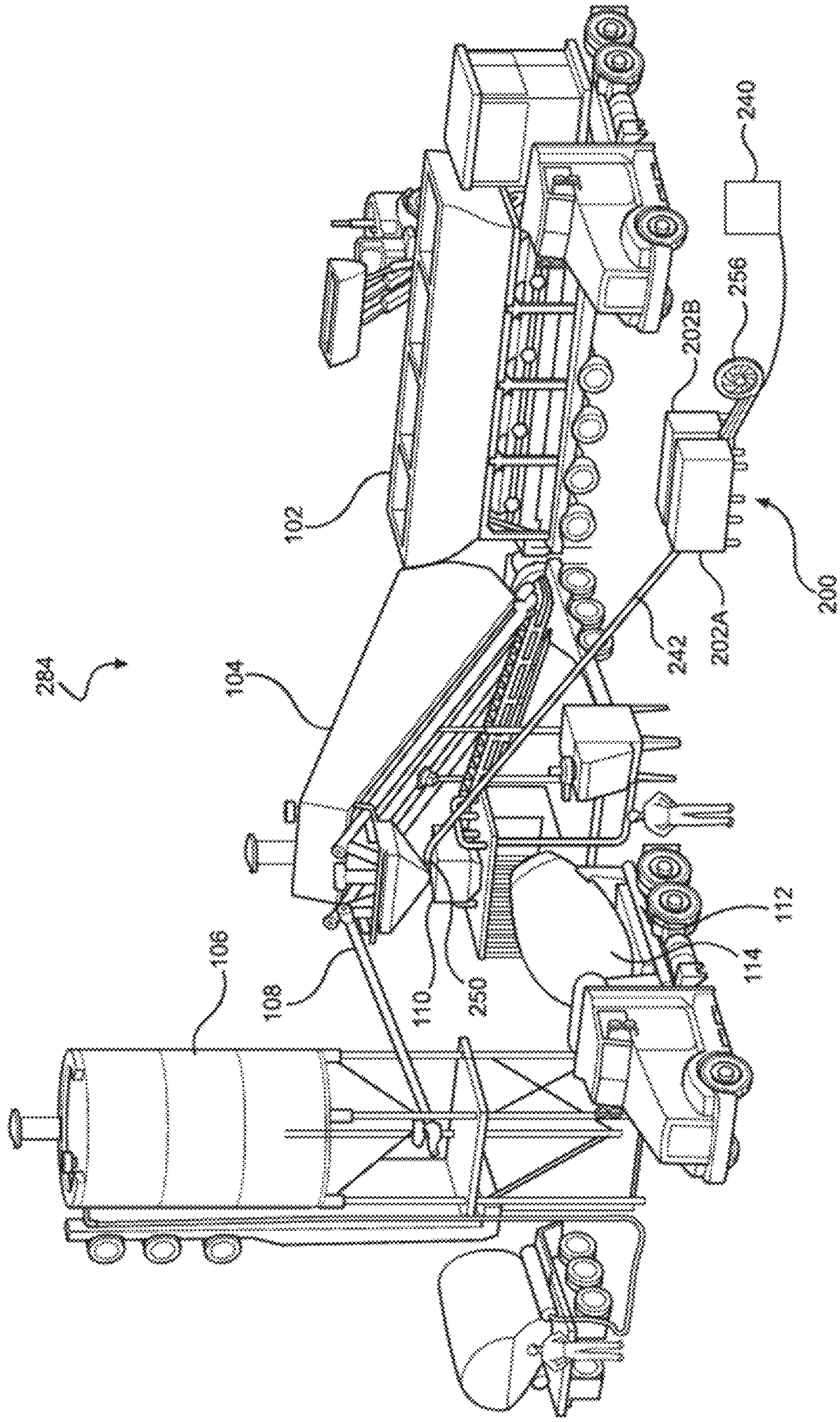
FIG. 8 is a perspective view of a concrete mixing plant incorporating a system for metered dispensing of a fiber additive into a concrete mixing system according to certain embodiments of the present invention.

The present invention also provides a method for providing a metered amount of a fiber additive to a concrete mixing system for forming a reinforced concrete mixture. With reference to FIGS. 4 and 5A and with further reference to FIG. 8, in certain embodiments, the method includes providing a concrete mixing system 284 with a fiber additive dispensing system, such as system 200 for dispensing the fiber additive into the concrete mixture. In use, the system 284 begins production of concrete by moving aggregate from the aggregate bin 102 to the aggregate conveyor 104. The aggregate conveyor 104 then moves the aggregate to the mixing station 110 where it is mixed with the cement delivered from the cement silo 106 via the screw conveyor 108. Based on the specific load of concrete being mixed, fiber additive may be desired. If fiber additive is desired, fiber additive is provided to the system 200. More specifically, fiber additive is placed into the interior 204 of the dispensing hopper 202 via the inlet 206 or rear doors 208, where the fiber additive rests atop and contacts the conveyor 220. A controlling input, or a series of controlling inputs, is provided to the controller 240. These inputs may be a total amount of fiber additive intended to be added to the concrete mixture, a current amount of fiber additive that has been added to the concrete mixture, a current amount of fiber additive remaining to be added to the concrete mixture, a target weight of the dispensing hopper 202, or and a target amount of the concrete mixture. After receiving a controlling input, the controller 240 activates the sensor 236 to measure a first amount of additive present in the dispensing hopper 202. The controller 240 activates the blower 256 and blower 264, if provided. The controller 240 then activates the conveyor 220, which begins moving fiber additive towards and through the discharge outlet 212, first passing through the size-adjustable area 214 created by the fixed first surface 216 and the movable second surface 218. In certain embodiments, the controller 240 activates dosing wheel 232 immediately before or contemporaneously with the conveyor 220. The dosing wheel 232, as it rotates, moves fiber additive through the size-adjustable area 214, preferably utilizing agitation knobs 234 while the conveyor 220 keeps pressure in the fiber by pushing the fiber against the dosing wheel. If provided, the air source 258 provides air to air nozzles 260, 262, or blower 264 activates to deliver air pulses, or a steady stream of pressurized air to the hopper 202. Using predetermined intervals, or if the sensor 236 detects no change in the amount of fiber additive present in the dispensing hopper 202, despite the conveyor 220 operating, pulses of air are delivered via the air nozzles 260, 262 or blower 264 to help break up any clogs or clumps which may be undesirably lowering the flow rate. Alternatively, or contemporaneously, the vibrator 231 is activated to vibrate the conveyor 220 to help settle and un-bridge any clumped fiber additive.

The fiber additive, after moving through the discharge outlet 212, passes through the opening 248 of the first end 246 of the discharge chute 242. Upon reaching the discharge chute 242, the fiber additive then moves through a preferably tapered transition towards the second end 250 of the discharge chute. The fiber additive can move through the discharge chute 242 via gravity, depending on the placement of the system 200. However, as shown in the illustrated embodiment, the blower 256 can provide a blowing force to move the fiber additive from the first end 246 towards and through the opening 252 of the second end 250. The blower 256 may alternatively pull fiber additive through the discharge chute 242. Additionally, if provided, the second blower 264 may aid in moving the fiber additive to or through blower 256.

If provided, the fluid mister 254 sprays fluid on the fiber additive before or while the fiber additive is exiting the discharge chute 242. In certain embodiments, the fluid mister 254 includes multiple stages 255 for delivering fluid to the fiber additive. In the illustrated embodiment, the opening 252 of the second end 250 of the discharge chute 242 is arranged to place the fiber additive into the mixing station 110. This allows the fiber additive to combine with the aggregate and cement before being placed into the truck 112. Alternatively, discharge chute 242 can be arranged to place the fiber additive directly into the drum 114 of the truck 112. Discharging fiber additive directly into the drum 114 allows for adding of fiber additive to preexisting, but not yet poured concrete.

As the fiber additive moves from the dispensing hopper 202 to the discharge chute 242, the sensor 236 monitors the amount of fiber additive remaining in the dispensing hopper. As the amount of fiber additive having exited the dispensing hopper 202 approaches the desired amount of fiber additive, the controller 240 activates a motion control device (gears, hydraulic cylinders, levers, etc.) to move the movable second surface 218 towards the fixed first surface 216. This reduces the size of the size-adjustable area 214 and lowers the amount of fiber additive passing through the discharge outlet 212. Additionally, or alternatively, the controller 240 may also reduce the rotational speed of the conveyor 220 or the dosing wheel 232, or both. The sensor 236 continues to monitor the amount of fiber additive remaining in the dispensing hopper 202 and upon reaching the desired amount of fiber additive, the controller 240 issues commands to deactivate the conveyor 220, deactivate the dosing wheel 232, and/or move the movable second surface 218 towards the fixed first surface 216 such that the size-adjustable area 214 no longer allows fiber additive to pass to the discharge outlet 212. After a predetermined amount of time to ensure all the fiber additive has exited the discharge chute 242, the controller 240 deactivates the blower 256 and, if active, the blower 264. In certain embodiments a trigger percentage is provided to the controller 240. The trigger percentage generally corresponds to the desired amount of fiber to be dispensed. Then, using the sensor, detecting the amount of fiber dispensed from the dispensing hopper. Upon reaching the trigger percentage, using the controller, reducing a speed of the conveyor and the rotational speed of the dosing wheel as the sensor 236 detects a discrete amount of fiber additive.

As a non-limiting example, the trigger percentage may be 80% and the desired amount of fiber additive may be 100 lbs. After the fiber additive is placed in the hopper 202, the sensor 236 detects the total amount of fiber in the hopper, for example 300 lbs. The conveyor 220 and the dosing wheel 232 are activated and fiber additive begins leaving the hopper 202 via discharge chute 242. As the sensor measures the amount of fiber remaining in the hopper 202 to be 220 lbs, the controller reduces the speed of the conveyor and the dosing wheel 232. This lowers the discharge rage of the fiber additive to ensure an accurate amount of fiber additive is being added to the concrete. When the sensor 236 detects the remaining fiber in the hopper 202 to be 200 lbs, both the dosing wheel 232 and the conveyor 220 are deactivated as the desired amount of fiber additive has been distributed from the hopper.

In certain embodiments, like the illustrated embodiment, the system 200 includes a first dispensing hopper 202A and a second dispensing hopper 202B, each with its own internal components and sensor 236. The dispensing hoppers 202A, 202B, can be used to distribute different fiber additives, for example micro-fibers and macro-fibers, to a common discharge chute 242. In systems utilizing two dispensing hoppers 202A, 202B, fiber additive is provided to each dispensing hopper. Each sensor 236 measures the amount of fiber additive in each respective hopper 202 and provides that measurement to the 25 controller 240. The controller 240 then activates each conveyor 220 and, if present, each dosing wheel 232, independently based on the desired amount of each fiber additive. Because each dispensing hopper 202A, 202B has a sensor 236, the amount of each fiber additive in each dispensing hopper is independently monitored and distributed accordingly. As the fiber additive exits the dispensing hopper 202A, 202B via the discharge outlet 212 and enters the discharge chute 242, the size-adjustable area 214 or rotational speed of the dosing wheel 232 is adjusted to alter the flow rate of the first fiber additive and the second fiber additive based on the series of inputs. Alternatively, or simultaneously, the conveyor 220 speed may be altered to adjust the flow rate of either fiber additive.

Although this description contains many specifics, these should not be construed as limiting the scope of the invention but as merely providing illustrations of some of the presently preferred embodiments thereof, as well as the best mode contemplated by the inventor of carrying out the invention. The invention, as described herein, is susceptible to various modifications and adaptations as would be appreciated by those having ordinary skill in the art to which the invention relates.

What is claimed is:

1. A system for dispensing a fiber additive into a mixing system, the system comprising:

a dispensing hopper having a hollow interior that is sized and configured to receive and store said fiber additive and wherein the dispensing hopper is configured to selectively dispense the fiber additive;

a discharge outlet having an adjustable area through which fiber additive can pass and that is formed between a first surface and a second surface for enabling fiber additive to pass out of the dispensing hopper and into the mixing system, wherein fiber additive passing out of the dispensing hopper via the discharge outlet passes between the first surface and the second surface, the first and second surfaces being movable with respect to the other;

a conveyor having a receiving end and a discharge end and that is disposed in a bottom of the dispensing hopper such that at least a portion of the fiber additive stored within the dispensing hopper is configured to be placed on top of the conveyor at the receiving end, wherein the conveyor is configured to aid in moving fiber additive within the dispensing hopper towards and through the discharge outlet and to dispense the fiber additive from the discharge end;

a sensor configured to sense at least one of an amount of fiber additive that is disposed within the system;

a controller configured to control the amount of fiber additive dispensed from the dispensing hopper via the discharge outlet by selectively modifying at least one of a speed of the conveyor and a size of the discharge outlet, wherein the adjustable area of the discharge outlet is modified by moving the second surface with respect to the first surface; and a dosing wheel disposed proximate the discharge end of the conveyor and that provides the second surface, wherein the dosing wheel is driven by a motor to rotate at a rotational speed about a central axis and is configured to contact and to prevent fiber additive from passing out of the dispensing hopper absent a rotation of the dosing wheel.

2. The system of claim 1 further comprising a loading hopper for removably connecting to the dispensing hopper and for re-supplying the dispensing hopper with fiber additive, the loading hopper having a first end that is configured to receive fiber additive for temporary storage in the loading hopper and a second end that is removably engaged with an inlet of the dispensing hopper and that is configured to be remotely moved between an open position and a closed position, wherein, when the second end of the loading hopper is in the closed position, fiber additive that is temporarily stored within the loading hopper is prevented from being dispensed from the loading hopper, wherein, when the second end of the loading hopper is engaged with the inlet of the dispensing hopper and is in the open position, fiber additive that is temporarily stored within the loading hopper is permitted to flow out of the loading hopper and then into the dispensing hopper, and wherein the mixing system is a concrete mixing system.

3. The system of claim 1 wherein the first surface is provided by the discharge end of the conveyor, wherein the system is further configured to move the second surface towards and away from the first surface in order to decrease and increase, respectively, the adjustable area of the discharge outlet, wherein the controller is further configured to control the amount of fiber additive dispensed from the dispensing hopper via the discharge outlet by selectively modifying the rotational speed of the dosing wheel, and wherein the mixing system is a concrete mixing system for producing a fiber reinforced concrete mixture.

4. The system of claim 3 further comprising an enclosed discharge chute having a first end with an opening that is configured to receive fiber additive that passes between the first surface and the second surface via the conveyor and a second end having an opening that is configured to dispense fiber into the concrete mixing system fiber additive that passes through the chute.

5. The system of claim 4 further comprising a fluid mister that is disposed at the second end of the discharge chute and that is configured to spray fiber additive passing through the discharge chute before the fiber additive is dispensed into the concrete mixing system.

6. The system of claim 5 wherein the fluid mister comprises a plurality of misters disposed at intervals along the second end of the discharge chute.

7. The system of claim 4 further comprising a blower configured to provide a variable blowing force to move the fiber additive through the discharge chute, out of the opening at the second end of the discharge chute, and into the concrete mixing system.

8. The system of claim 7, wherein the variable blowing force is adjusted based at least one of: a total amount of fiber additive that is intended to be added to the concrete mixing system, a current amount of fiber additive that has been added to the concrete mixture, a current amount of fiber additive that remains to be added to the concrete mixture, a target weight of the dispensing hopper, and a target amount of the concrete mixture.

9. The system of claim 7 further comprising a source of pressurized air for delivering an amount of the pressurized air to the fiber additive separately from the blowing force.

10. The system of claim 1 wherein the mixing system is a concrete mixing system for producing a reinforced concrete mixture, and wherein the dispensing hopper comprises a first dispensing hopper sized and configured to receive a first fiber additive and a second dispensing hopper sized and configured to receive a second fiber additive that are combined together and provided to the concrete mixing system for use producing the reinforced concrete mixture.

11. The system of claim 10 wherein the first dispensing hopper and the second dispensing hopper are disposed on a common, unitary chassis.

12. The system of claim 11 further comprising a combined enclosed discharge chute having a first end with an opening that is configured to receive and to combine the first and second fiber additive passing out of the first and second dispensing hoppers and having an opening that is configured to discharge the combined fiber additive into the concrete mixing system.

13. The system of claim 12 further comprising a blower disposed at the first end of the discharge chute and configured to provide a variable blowing force to the combined fiber additive.

14. The system of claim 13 wherein the first and second dispensing hoppers are provided with separate discharge outlets and separate conveyors and the speed of the conveyor and the adjustable area of the discharge outlet of each of the first and second dispensing hoppers are independently adjustable via the controller such that amounts and rates of the first and second fiber additive passing out of each of the first and second dispensing hoppers may be independently adjusted.

15. The system of claim 14 wherein the first surface of the adjustable area of each of the first and second dispensing hoppers is provided by the discharge end of each conveyor, the system further comprising a first dosing wheel disposed proximate the discharge end of the conveyor of the first dispensing hopper and a second dosing wheel disposed proximate the discharge end of the second dispensing hopper, each dosing wheel providing the second surface of the respective adjustable area, wherein each dosing wheel is driven by a motor to rotate at a rotational speed about a central axis and is configured to contact and to prevent fiber additive from passing out of the dispensing hopper absent a rotation of the respective dosing wheel and is further configured to move the second surface towards and away from the first surface in order to decrease and increase, respectively, the adjustable area of each discharge outlet, and wherein the controller is further configured to control the amount of fiber additive dispensed from the first and second dispensing hopper via the respective discharge outlet by selectively modifying the rotational speed of each dosing wheel.

16. The system of claim 15 wherein the first fiber additive comprises a micro-fiber additive and the second fiber additive comprises a macro-fiber additive.

17. A system for dispensing a fiber additive into a mixing system, the system comprising:

a dispensing hopper having a hollow interior that is sized and configured to receive said fiber additive and wherein the dispensing hopper is configured to selectively dispense the fiber additive;

a discharge outlet formed between a first surface and a second surface for enabling fiber additive to pass out of the dispensing hopper and into the mixing system, wherein fiber additive passing out of the dispensing hopper via the discharge outlet passes between the first surface and the second surface;

a conveyor having a receiving end and a discharge end and that is disposed in a bottom of the dispensing hopper such that at least a portion of the fiber additive within the dispensing hopper is configured to be placed on top of the conveyor at the receiving end, wherein the conveyor is configured to aid in moving fiber additive within the dispensing hopper towards and through the discharge outlet and to dispense the fiber additive from the discharge end; and a dosing wheel disposed proximate the discharge end of the conveyor, wherein the dosing wheel is driven by a motor to rotate at a rotational speed about a central axis and is configured to contact and to prevent fiber additive from passing out of the dispensing hopper absent a rotation of the dosing wheel.

18. A method for providing a metered amount of a fiber additive to a concrete mixing system for forming a reinforced concrete mixture, the method comprising the steps of:

providing said concrete mixing system;

providing a dispensing system for dispensing the fiber additive into the concrete mixture comprising:

a dispensing hopper having a hollow interior that is sized and configured to receive and store fiber additive and wherein the dispensing hopper is configured to selectively dispense the fiber additive;

a discharge outlet having an adjustable area through which fiber additive can pass and that is formed between a first surface and a second surface for enabling fiber additive to pass out of the dispensing hopper and into the concrete mixing system, wherein fiber additive passing out of the dispensing hopper via the discharge outlet passes between the first surface and the second surface, the first and second surface being movable relative to the other surface;

a conveyor having a receiving end and a discharge end and that is disposed in a bottom of the dispensing hopper such that at least a portion of the fiber additive stored in the dispensing hopper is configured to be placed on top of the conveyor at the receiving end, wherein the conveyor is configured to move fiber additive stored within the dispensing hopper towards and through the discharge outlet and to discharge the fiber additive from the discharge end;

a sensor configured to sense an amount of fiber additive that is disposed within the dispensing system;

a controller configured to control the amount of fiber additive dispensed from the dispensing hopper via the discharge outlet by selectively modifying at least one of a speed of the conveyor and an adjustable area of the discharge outlet, wherein the adjustable area of the discharge outlet is modified by moving the first surface with respect to the second surface;

a dosing wheel having a central axis, the dosing wheel disposed proximate the discharge end of the conveyor; and a motor configured to rotate the dosing wheel at a rotational speed about the central axis, wherein the controller is further configured to control the amount of fiber additive dispensed from the dispensing hopper via the discharge outlet by selectively modifying the rotational speed of the dosing wheel, and wherein the dosing wheel provides the second surface;

placing fiber additive into the dispensing hopper;

using the sensor, sensing a first amount of fiber additive that is disposed within the dispensing system;

activating the conveyor and discharging fiber additive from the dispensing hopper via the discharge outlet at a first rate of discharge;

using the sensor, sensing a second amount of fiber additive that is disposed within the dispensing system; and using the controller, modifying one of the speed of the conveyor or the adjustable area of the discharge outlet in order to provide a second and different rate of discharge for dispensing fiber additive from the dispensing hopper via the discharge outlet.

19. The method of claim 18 further comprising the step of:

activating the dosing wheel and discharging fiber additive from the dispensing hopper via the discharge outlet at a first rate of discharge; and using the controller, modifying the rotational speed of the dosing wheel in order to provide a second and different rate of discharge for dispensing fiber additive from the dispensing hopper via the discharge outlet.

20. The method of claim 19 further comprising the steps of:

providing the controller with a desired amount of fiber additive to be dispensed from the dispensing hopper;

providing the controller with a trigger percentage, the trigger percentage corresponding to a percentage of the desired amount of fiber additive to be dispensed;

using the sensor to detect the amount of fiber additive dispensed from the dispensing hopper;

upon reaching the trigger percentage, using the controller, reducing a speed of the conveyor and the rotational speed of the dosing wheel as the sensor detects a discrete amount of fiber additive; and once the desired amount of fiber additive is dispensed, using the controller, deactivating the conveyor and ceasing rotation of the dosing wheel.

* * * * *